United States Patent [19]
Brown, Jr. et al.

[11] Patent Number: 5,952,055
[45] Date of Patent: Sep. 14, 1999

[54] METHOD OF PROTECTING REINFORCED CONCRETE STRUCTURES

[76] Inventors: Carl W. Brown, Jr., 8260 Callow Rd., Leroy Township, Ohio 44077; John E. Bennett, 10039 Hawthorne Dr., Chardon, Ohio 44024; John J. Bartholomew, 9005 Lakeshore Blvd., Mentor; Barry L. Martin, 8132 S. Chariot, Concord, both of Ohio 44060; Thomas J. Schue, 11670 Madison Rd., Huntsburg, Ohio 44046

[21] Appl. No.: 09/119,270

[22] Filed: Jul. 20, 1998

Related U.S. Application Data

[60] Division of application No. 08/371,544, Jan. 19, 1995, Pat. No. 5,879,817, which is a continuation-in-part of application No. 08/196,723, Feb. 15, 1994, abandoned.

[51] Int. Cl.$^6$ .............................. C23C 4/04; C23C 4/06; C23C 4/10; C23C 4/18
[52] U.S. Cl. .......................... 427/454; 427/446; 427/453; 427/455; 427/456; 427/58; 427/123; 427/126; 427/126.3; 427/126.5; 427/331; 427/404; 427/419.2; 52/515; 205/734
[58] Field of Search ..................................... 428/621, 628, 428/629, 632, 660, 662, 663, 209, 304.4, 306.6, 307.3, 307.7, 318.4, 319.1, 457, 469, 422, 703, 699; 52/515; 405/211.1, 216; 427/446, 448, 453, 454, 455, 456, 58, 123, 126, 126.3, 126.5, 331, 404, 419.2; 205/734

[56] References Cited

U.S. PATENT DOCUMENTS

| | | | |
|---|---|---|---|
| 3,711,385 | 1/1973 | Beer | 204/59 |
| 4,506,485 | 3/1985 | Apostolos | 52/515 |
| 5,066,513 | 11/1991 | Zurecki et al. | 427/37 |
| 5,364,511 | 11/1994 | Moreland et al. | 204/196 |
| 5,411,646 | 5/1995 | Gossett et al. | 204/147 |

*Primary Examiner*—Vivian Chen
*Attorney, Agent, or Firm*—John J. Freer; David J. Skrabec; Michele M. Tyrpak

[57] ABSTRACT

A method of protecting reinforced concrete structures comprising of applying a protective cathodic coating containing a non-corroding metal and an electrochemically active material on concrete wherein the protective coating is formed by thermally spraying a mixture of said non-corroding metal such as a valve metal and said electrochemically active material. The coating may also be formed by applying a precursor of the electrochemically active material and a metal-containing layer to concrete, then anodically polarizing said metal layer to convert the precursor into an electrochemically active material.

12 Claims, No Drawings

METHOD OF PROTECTING REINFORCED CONCRETE STRUCTURES

CROSS-REFERENCE TO RELATED APPLICATION

This application is a divisional of application Ser. No. 08/371,544, filed Jan. 19, 1995, now U.S. Pat. No. 5,879,817, which is a continuation-in-part of application Ser. No. 08/196,723, filed Feb. 15, 1994, abandoned.

BACKGROUND OF THE INVENTION

In addition to reinforcing concrete internally with metal, it has been known to apply metal to the surface of concrete. In U.S. Pat. No. 1,898,864 a metal-faced building unit is prepared. The building unit is of a material such as concrete or cement. The metal facing, e.g., a steel facing, can be adhesively adhered to the concrete or cement body of the building unit.

Where the concrete is reinforced concrete, and the concern is corrosion of reinforcement embedded in the concrete, the metal applied to the concrete surface may be for retarding metal reinforcement corrosion. In U.S. Pat. No. 4,506,485, it is taught to flame spray an electrically conductive metal, e.g., zinc, onto a freshly exposed surface of concrete. The concrete can have steel embedded therein as reinforcement. The sprayed metal cover and embedded steel are joined in an electric circuit. Such means will be useful for precluding deterioration of the embedded reinforcement.

By covering a concrete surface with flame sprayed zinc and then electrically connecting the zinc with steel reinforcement of concrete, the assembly takes advantage of the sacrificial characteristic of the zinc to cathodically protect the embedded reinforcement. This leads to a gradual loss of zinc and loss of effectiveness of cathodic protection. It would be desirable to avoid or retard this loss.

It would be further desirable to provide a system that combines effective concrete-to-applied-metal bond strength, together with fast application and enhanced long term protection.

SUMMARY OF THE INVENTION

A system has now been devised for inhibiting corrosion of metal embedded as reinforcement in concrete, with the system having enhanced economic potential. The system also combines such potential with efficiency and economy of application. The system utilizes applied metal, which can be a very thinly applied layer of metal, on a surface of concrete. The metal can have an excellent long lifetime. During such extended lifetime, the system can provide a uniformity of performance, free from not only premature failure, but also free from a gradual performance decline, which decline accelerates deterioration of embedded reinforcement.

In brief, the invention in a particular aspect is directed to concrete coated with a thermally sprayed, non-corroding and tightly adherent electrochemically active metallic coating. As a part of this aspect of the invention, there might be included on the concrete a porous titanium coating on a roughened surface of the concrete.

In another aspect, the invention is directed to coated concrete, coated with a thermally sprayed tightly adherent coating of non-corroding metal plus active material, with one or both of the metal and active material being thermally sprayed onto the surface of the concrete. The metal may form an overlay on a surface activation layer, or the metal plus active material can be thermally sprayed together onto the concrete.

And still a further aspect of the invention is directed to the method of protecting reinforced concrete with a cathodic protection coating on the surface of the concrete, which method comprises thermally spraying together an active material plus non-corroding metal onto the surface of the concrete.

Another aspect of the invention is directed to the method of cathodically protecting reinforced concrete with a non-corroding, electrochemically active coating which is present as a metal-containing coating on the surface of the concrete, which coating initially contains a metal having at its surface a precursor composition convertible to an active ingredient for the coating. This invention aspect comprises establishing on the concrete such coating comprising the precursor composition, connecting the metal of the coating in an electrical circuit, and anodically polarizing the metal to convert the precursor composition to active ingredient.

Another invention aspect relates to the method of applying a tightly adherent, non-corroding and electrochemically active metallic coating to a surface of a concrete substrate, which method comprises:

roughening the surface of the concrete by abrading the surface and freshly exposing a concrete surface; and thermally spraying a metal onto the resulting roughened surface with a spray gun in an amount of sprayed metal having a thickness of from about 20 microns to about 200 microns;

wherein the spraying comprises:

applying the metal onto the concrete at a standoff from the surface of the concrete within the range of from about 2½ inches to about 6 inches; while conducting such spraying at an application rate across the concrete surface at a gun speed within the range of from about 100 to about 800 millimeters per second.

In yet another aspect the invention is directed to coated concrete coated with an integrally attached, electrochemically active oxide coating.

Where the invention includes a thermally sprayed, non-corroding and tightly adherent electrochemically active metallic coating, the metallic coating may be a metal that is activated with an active material, e.g., as by application of an electrochemically active coating. Thus, as used herein, the term "metallic coating" can refer to a metal that is activated.

As mentioned hereinabove, if an active material is used, it may be that both such material and a metal, or metals, are thermally sprayed, which can be separately, or co-sprayed together. When separately sprayed, the active material, or possibly one or more precursors of the material, may be applied before the metal, or after the metal, or both before and after.

DESCRIPTION OF THE PREFERRED EMBODIMENTS

The metal coating is applied to the surface of an underlying material which generally for convenience will be referred to herein as "concrete". However, it is to be understood that other similar masonry materials may be utilized including mortars and grouts. Grouts and mortars may contain cement, and may be used as an overlay, as on concrete. The concretes which are contemplated to be metal coated include not only typically Portland cement concrete but also structural concrete, ready mix concrete, low slump concrete, and polymer modified concrete. The cements contemplated include any of the recognized types of cements such as high-early-strength cement, Portland-Pozzolan cements, and masonry cements (mortars).

For reinforcement the concrete will usually have an embedded reinforcement, or a reinforcing shape, such as a wire or bar, which bar may be referred to as a "rebar". These will be metal reinforcements generally of a ferrous material and most usually will be a steel reinforcing material.

The surface of the concrete to receive the spray applied metal should be clean and sound. A freshly prepared surface may be cleaned by blasting with compressed air. Usually, cleaning will be done by sandblasting, waterblasting, scarification, shotblasting, and other similar methods. These methods may provide not only a clean, but also a freshly exposed, roughened concrete surface. One particularly desirable method for preparing a clean concrete surface is gritblasting. Serviceable grit for such purpose can include, aluminum oxide, steel shot, slag, quartz sand, silica and silicon carbide. Where sandblasting or gritblasting has been used, this can be followed by waterblasting or cleaning with compressed air for grit removal. Such provides a suitably desirable clean and rough surface for augmented bond strength between the concrete and applied metal layer.

In the surface preparation, the blast media should desirably roughen the surface. This can provide a surface texture, as by abrading the concrete. Extreme abrasion can, however, be deleterious and weaken the concrete. Thus removal of about ⅛ inch to 1/16 inch of the abraded portion of the surface is usually serviceable. The resulting surface texture can provide for enhanced adhesion and integral attachment of the subsequently applied coating on the concrete, as well as provide for good electrical contact between the concrete and the applied coating.

When a freshly exposed and roughened clean surface has been obtained, a surface coating is then applied to the concrete. For the metallic coating, it is a thermally sprayed, non-corroding and electrochemically active metallic coating. To be non-corroding, the metal of the surface coating should have a corrosion rate of less than about 0.05 mil per year when polarized anodically, at a current density of at least about 10 milliamperes per square meter ($mA/m^2$). Thus a metal such as zinc which has a corrosion rate of about 1 mil per year under such conditions is completely unsuitable. Other such metals as magnesium and aluminum, as well as alloys such as zinc-aluminum alloys, babbitt, 316 stainless steel or 420 stainless steel, which have a greater corrosion rate than 0.05 mil per year, are not utilized. Metals which are non-corroding, i.e., have the above-defined low corrosion rate, can be serviceably employed in cathodic protection of the concrete reinforcing metal. Such cathodic protection will connect such reinforcement metal and the applied metal coating in an electrical circuit containing a power supply.

It is also important that the applied coating on the concrete be an active metallic coating. By being "active" as the term is used herein, the metallic coating is capable of freely and easily passing anodic current for an extended period of time, typically several years, e.g., 2–5 years or more, while being non-corroding, when the reinforcement and the metallic coating are electrically connected. As explained hereinabove, such active metallic coating may be a metal that is activated. An example of a metal that is activated is a metal to which there is applied an electrochemically active coating.

A metal of particular interest is titanium metal. Titanium metal has a corrosion rate of less than 0.05 mil per year when polarized anodically. As a suitable active metallic coating, it is contemplated that the titanium metal will virtually always be activated such as by applying an electrochemically active coating to the metal, as will be discussed further on hereinbelow.

Typically, in addition to titanium, suitable metals include the valve metals, but excluding aluminum. More particularly, these valve metals, in addition to titanium, are tantalum, niobium, zirconium, hafnium, molybdenum and tungsten. Additionally, any of these metals may be utilized as their alloys or intermetallic mixtures. These can be alloys or mixtures among the valve metals themselves, as well as with other metals. These will be employed so long as the appropriate criteria, e.g., the alloy or mixture being non-corroding, are met. All of these valve metals or alloys or the like may be activated by application of electrolytic coating. For economy, as well as efficiency of cathodic protection, titanium is the preferred valve metal. It will usually be referred to herein when specifying a metal, particularly a metal that is activated, although it will be understood that metals other than titanium could be employed. In referring to titanium, it will usually be termed the "representative" metal.

It is to be understood that mixtures of metals can also be applied. For mixtures of metals, the mixtures may take the form of doping. As representative, a metal may be doped with typically from 2 to as much as 20 weight percent or more of an additional metal. As an example, this could be doping of titanium with one or more of nickel, chromium, manganese, tin or iron. As representative, U.S. Pat. No. 4,849,085 discusses flame spraying a powder mixture of 9% nickel powder and 91% titanium powder.

The metal coating will be achieved by means which include thermal spray application. This will most always be flame spraying or electric arc spraying. Thus the feed material will most always be in wire form, although the use of a similar form, e.g., rod form, is contemplated. In electric arc spraying the wires, suitably as two consumable wires, can serve as electrodes. The wires may be in alloy form, e.g., where an active metal as an alloy is being thermally deposited. In some instances, plasma spraying may be the thermal spray operation of choice. For example, where a metal is readily available in particulate form, such as in elemental form or as a mixture as represented by a mixture of nickel and titanium metal powders, then plasma spraying of such particulate form material can be most serviceable. Also, spraying of an oxide material can most always be by plasma spray application. Oxide materials, or just "oxides", which may also be otherwise referred to herein for convenience as "ceramic oxides", can be useful as activating materials, and will be discussed in greater detail hereinbelow.

Whether the metal feed is in wire form or the like, or in particulate form, the metal impacting the concrete will be in particulate form such as droplets of molten metal or semi-molten metal in plastic form. Thus for convenience, application may be referred to herein as material applied in particulate form. In plasma spraying, the metal is melted and sprayed in a plasma generated by heating with an electric arc of ionized inert gases to high temperatures, e.g., argon or nitrogen, optionally containing a minor amount of additional gas such as hydrogen or helium. In such spraying, and more particularly in arc spraying and flame spraying, nitrogen is the preferred inert gas, and without being in admixture with other gases. It is to be understood by the use herein of the term "thermal spraying" that although electric arc spraying is preferred, the term is generally used for convenience and is meant to include generally high velocity oxyfuel spraying, flame spraying, plasma spraying, or detonation gun spraying. Also, the spraying may simply be referred to as "melt spraying".

The spraying parameters, such as the volume and temperature of the spray, the spraying distance, the feed rate of the constituents being sprayed and the like, are chosen so that, for the spraying of metal, it is melted by and in the spray stream and deposited on the concrete surface while still substantially in melted or semi-plastic form. Representative spray parameters can include a standoff of from about 2½ to 6 inches. Less than about 2½ inches may lead to deleterious heating of the substrate, with accompanying substrate degradation such as spalling or cracking. A standoff of greater than 6 inches may lead to inefficient deposition and poor particle adhesion to the substrate. Usually the spray gun will be swept across the concrete surface at a gun speed of from about 100 to about 800 millimeters per second (mm/sec), or more generally at a gun speed of from about 200 to about 500 mm/sec. This speed, plus the material feed rate and the number of passes of the gun over the same area of concrete, will in large part determine the thickness of the resulting coating. Generally, at a gun speed of from about 100 to about 400 mm/sec. from 1 to 3 passes will be made with the gun when spraying the representative titanium metal.

However, for thin coatings faster gun speeds at only one pass or so, can be desirable. Typically, spray parameters like those used in the examples give satisfactory results. Usually, the concrete surface during melt spraying is maintained near ambient temperature. Usually simply allowing the substrate to air cool between spray passes will be sufficient to maintain an ambient temperature substrate. For some applications, e.g., applications at low ambient temperatures or for substrates with high moisture content, it may be useful to preheat the substrate surface before thermal spray application. This can be done by using the spray device, but without a material feed, although other means are contemplated. Preheating of a substrate can enhance the bond between the applied metal coating and the substrate.

Although the spray feed material may be in other form, e.g., particulate form, it is typically in wire form. For the representative metal titanium, it will typically be about a 0.05 inch to about a 0.2 inch diameter wire. The wire may be pretreated, such as to enhance the application of an active metallic coating. Pretreatment of titanium feed wire for arc spraying has been described in U.S. Pat. No. 5,066,513. In powder form, the titanium might have a particle size range of 0.1–500 microns. Particulate metals having different particle sizes should be equally suitable so long as they are readily spray applied. The constituency of the particles is usually virtually all, to all, metal. For titanium, as particles or wire, the titanium might be one of several grades most usually grade 1 titanium or an alloy of titanium.

The thermally sprayed metal can have a thickness on the concrete of from about 20 microns to on the order of 150 to about 200 microns. A coating thickness of less than about 20 microns may result in non-uniformity of the coating and can result in increased electrical resistance of the coating. On the other hand, for economy, the thickness of the applied metal will not exceed about 200 microns. For the representative titanium metal, a coating thickness within the range of from about 25 to about 100 microns can be suitable. In plasma spray application of titanium powder, this can be readily achieved in typically one to two passes of the spray gun over the concrete surface, e.g., at a gun speed of 400 mm/sec. If due care is not exercised, coating thicknesses above about 150 microns may lead to some potential metal delamination for titanium metal. Thus, coating thicknesses above about 150 microns are less usual. Advantageously, for enhanced economy, plus efficiency and extended cathodic protection for the applied metal, the metal will be present on the concrete surface at a thickness within the range from about 25 to about 100 microns.

The applied metal coating will generally have a porosity typically from at least about 5%, but not exceeding about 30%. The characteristic of porosity is particularly serviceable for applied metals wherein an active material is applied to the metal. Porosity assists in providing for penetration of any applied activating coating into the applied metal, thus enhancing electrochemical activity of the overall coating. A porosity of the applied metal of less than about 5% will be insufficient to provide for desirable activation coating penetration. On the other hand, a porosity for the metal of greater than about 30% may lead to uneconomical application of the active coating onto the concrete, rather than on the metal. Advantageously for enhanced deposition of active coating, the metal will have a porosity of from about 10% to about 25%. The applied metal should have a bond strength with the underlying concrete of at least about 50 pounds per square inch (psi). Moreover, to maintain good coating integrity, as on surfaces that may be subject to abrasion or other rough treatment, and again particularly on non-horizontal surfaces, it will be advantageous for the applied metal to have a bond strength with the underlying concrete of at least about 100 psi. It will, however, not be unusual for the metallic coating to adhere to the underlying surface with a much greater bond strength, e.g., 200 to 500 psi or more. Bond strength as discussed herein is such strength as determined by measurement with an Elcometer adhesion tester, as will be described hereinbelow in connection with the examples.

When a clean surface or freshly exposed clean surface of the underlying concrete has been prepared, subsequent coating may be initiated by first application of an activating material, followed by application of a conductive coating over the first applied activating material. Where coating of the concrete is initiated with activating material, the resulting concrete may be referred to herein as an "activated concrete surface". For this surface activation, there may be applied to the concrete surface the activating material either in liquid form, usually as a precursor composition, or the activating material can be applied in solid form. In either form, the resulting coating can be in adherent, electrical contact with the concrete. As an example of solid form application, a freshly prepared concrete surface could have applied thereto a coating of solid ceramic oxide. This could include application by thermal spraying, or other application technique. Thus, in thermal spray application, a solid material such as magnetite may be a first layer thermally sprayed onto the prepared concrete surface. As representative of surface activation by liquid application, a solution of cobalt nitrate hexahydrate could be applied to the concrete. This type of activation will be discussed in greater detail hereinbelow. After application in either liquid or solid form, the application could be followed by applying an overlay, as by thermal spraying, of a metal. Such a coating overlay could be the application of the representative titanium metal. The first applied coating might be an active coating containing additive, e.g., a spray applied oxide applied together with niobium or tin as a dopant.

Where the first applied coating is an active coating applied in solid form, e.g., a thermally sprayed, tightly adherent surface activation layer, it should have characteristics of the applied metal. Thus, it should have adhesion to the concrete substrate of at least 50 psi. It may be a very thin coating, i.e., on the order of about 20 microns. Usually for economy, such first applied active coating will have a thickness not exceeding about 100 microns. However, such first applied active coating in solid form can have extensive porosity, e.g. up to about 50%, or even more. However, it is to be understood that a completely non-porous solid form first coating can be utilized, although for economy such is typically avoided.

When the first applied coating is the active coating, and the overlay will be applied metal, such applied metal may be porous, as where there will be subsequent treatment of the active coating, as described hereinbefore, or it may be non-porous, e.g., when no further treatment of the active coating is contemplated. Since the activation has been initiated before the application of the metal, deposition of active material within the subsequently applied metal will usually not be of consideration. When the metal is the overlay on an activating layer, the metal topcoating can have a thickness on the order which is similar for such coating as first applied, e.g., from about 20 to about 200 microns. The adhesion of such metal topcoating should also be at least on the order of the adhesion of a solid underlayer to the concrete substrate, to maintain integrity of overall coating longevity. Also by providing a tightly adherent metal overlay on the surface activation layer, there is maintained not only integral attachment but also desirable electrical contact from the concrete to the overlay. Although the active layer can be the first applied coating and the next layer can be an applied metal overlay, it will be understood that there may be some intermingling of these materials without a clear and uniform distinction between layers. Such intermingling of materials can be enhanced by the porosity of the first layer.

Where the underlying concrete has been prepared for coating, it is also contemplated that the active layer and the metal may be applied simultaneously. This can also provide for interlingling of applied materials. Thus in an application such as thermal spray technique, an activator material in solid form can be thermally sprayed onto the concrete while at the same time a metal is being sprayed onto the concrete. The resulting overall coating can be a non-porous coating, although some porosity, e.g. on the order of as little as 1% to as much as 5 percent may be present in the coating owing to the coating application technique. When jointly applied as an active layer plus applied metal, the resulting joint coating will typically have an adhesion to the underlying concrete the same as for the coatings applied individually, i.e., a bond strength of at least about 50 psi. Coating thicknesses for the jointly applied materials will usually tend to run towards the higher levels of thicknesses for the individually applied layers, e.g. jointly applied coating thicknesses on the order of 100 to 200 microns.

The ceramic oxide solid form activating material, which may also be referred to herein as the "conductive oxide", and that might be utilized in the melt spray procedure can be in particulate form, e.g., titanium oxide powder. Such powder may be sprayed from commercial non-conducting oxide, but deposit as a conductive sub-oxide. This can be influenced by the application temperature, and in spraying, such as plasma spraying, by the composition of the plasma gases. The oxide as a powder can have a particle size that correlates generally to the particle size that would be used if the corresponding metal were being sprayed. For example, titanium oxide powder might have a particle size within the range of 0.1–500 microns. The size of the oxide powder can also be varied in the melt spray operation to control the resulting density of the oxide layer. More finely divided powder generally provides a more dense, less porous layer. In addition to the thermal spraying providing conductive valve metal oxides, e.g., titanium suboxide, tantalum oxide and niobium oxide, it is also contemplated to thermally spray other materials including, but not limited to, titanates, spinels, magnetite, tin oxide, lead oxide, manganese dioxide and perovskites.

It is also contemplated to thermally spray together the active material and the metal. Thus mixtures may be applied, e.g., mixtures of metals and active material, such as a premix of blended powders sprayed from a single spray gun. As representative, titanium could be in a mixture with at least one other metal, and this mixture could be extended to include at least one oxide of a metal. Also, the metals and active materials may be cosprayed, e.g., each sprayed from a separate gun, but at the same time, to mix together on the concrete surface, or sprayed in layers, for example a metal layer sprayed onto a spray applied oxide layer. Where the spray application will result in layers, the top layer could be a metal or cosprayed layer.

Where the concrete has been prepared for coating, and metal is applied, a subsequent treatment can be used on the metal coating for activation. This can be application of activating material in liquid form. In such procedure, and regardless of whether the liquid form activating material is applied directly to the concrete or to metal applied to the concrete, it is contemplated that such treatment can be performed by any technique useful for depositing a liquid coating onto a substrate surface. Most always painting, as by brush or spray application, will be used.

These techniques will also be useful where the activating material is applied directly to the concrete and a metal coating is applied, but there will be a subsequent treatment of the active coating. Such techniques can be utilized when applying further liquid, e.g., water, as to a porous titanium coating for best underlayer activation of a first-applied activating material.

Curing of applied coating, can follow application. For example, where a representative titanium metal coating is first applied to the concrete and then a liquid precursor composition convertible to an activating material is used, e.g., a precursor composition solution of cobalt nitrate hexahydrate, the applied composition may be subject to thermal activation. This will result in thermal deposition of an electrochemically active coating on the titanium metal. Heating provides for effective thermal conversion of the metal ions in the precursor composition to electrochemically active metals or metal oxides, e.g., cobalt oxide. This thermal conversion may be accomplished such as by flame or infra-red heating. Other liquid precursor compositions can also be utilized. In addition to cobalt, these can contain coating ingredients, e.g., metals in solution, such as represented by manganese, iron, tin, precious metals, e.g., platinum, and the like.

It is of particular interest, where the precursor composition for the activating material has been applied to either the concrete, or to the metal, or to both, to polarize the metal anodically to affect deposition of the active material in electrochemical active form, e.g., as oxides. As an example, cobalt nitrate hexahydrate precursor composition can be applied as an aqueous solution to thermally applied, representative titanium metal. The titanium metal can then be energized by anodic polarization to affect deposition of cobalt oxide at the surface of the titanium metal. Or the cobalt solution can be applied to the concrete. It will soak into the concrete so that the subsequently thermally applied metal, e.g., the representative titanium metal, will have the desired adhesion to the concrete, as discussed above. Then the titanium metal can be energized and effect cobalt oxide deposition on the portion of the titanium metal which faces the concrete. For efficiency, it is advantageous for any such anodic polarization that the metal be polarized at a current density of at least about 1 $mA/ft^2$.

As a representative of active materials that may be used, e.g., applied to the metal, some of which have been mentioned hereinbefore, are those provided from platinum or other platinum group metals or they can be represented by active oxide coatings such as platinum group metal oxides, magnetite, ferrite, cobalt spinel or mixed metal oxide coatings. Such coatings have typically been developed for use as anode coatings in the industrial electrochemical industry. Suitable coatings of this type have been generally described in one or more of the U.S. Pat. Nos. 3,265,526, 3,632,498, 3,711,385, and 4,528,084. The mixed metal oxide coatings can have at least one oxide of a valve metal and at least one oxide of a platinum group metal. The mixed oxides can often include a platinum group metal including platinum, palladium, rhodium, iridium and ruthenium or mixtures of these as well as mixtures with other metals. Further coatings can comprise tin oxide, manganese dioxide, lead dioxide, cobalt oxide, ferric oxide, platinate coatings such as $M_xPt_3O_4$ where M is an alkali metal and X is typically targeted at approximately 0.5, nickel-nickel oxide and nickel plus lanthanide oxides.

For application to concrete, e.g., spraying of either metal or ceramic oxide, the application is to almost always provide an essentially continuous coating, but one which may have porosity as above discussed. However, it is contemplated that the application may be other than continuous, such as in strip form, e.g., have unsprayed areas between sprayed strips, forming a grid with exposed areas of concrete between the sprayed strips, or in some other partial coating pattern on the substrate.

When coating of the concrete surface has been completed, the electrical resistance of the coating should be within the range from about 0.1 to about 20 ohms/sq. That is, a square centimeter after coating should have a resistance within such range when measured across the one centimeter dimension of the square. An electrical resistance of less than about 0.1 ohms/sq. can be uneconomical. An electrical resistance of greater than about 20 ohms/sq. is insufficient to carry the current without excessive voltage loss. Preferably the electrical resistance of the coating for an active metal coating utilizing the representative metal titanium, will have an electrical resistance of from about 0.1 to 1.0 ohms/sq.

Where the coating on the concrete will serve as an anode means, the coating may be covered. It may have a covering such as of paint or concrete. Also where the coating will serve as an anode, there can be connected to the anode a current lead, e.g., a metal wire or strip. This anode may then be connected by the current lead in an electrical circuit with a power source and to the concrete reinforcement. Where the coating of the concrete is initiated by application of activating material, the next applied layer is an electrically conductive overlay which is virtually always an applied metal overlay. However, it is also contemplated that such next applied layer can be other than a metal, such as an electrically conductive paint, including paints such as ceramic-oxide-containing paints, including mixed-metal-oxide-containing paints and carbon-containing paints where such substances as the oxides and the carbon are intimately mixed in the paint. In any case, the activation layer and the overlay are in adherent, electrically conductive contact with one another.

In addition to being serviceable, it is to be understood that the resulting coating can be decorative. Hence, a titanium coating on concrete may provide a pleasing metallic blue finish to a concrete surface. Other color tones of the coated concrete can include gray and gold tones.

The following examples show ways in which the invention has been practiced but should not be construed as limiting the invention.

EXAMPLE 1

For test purposes, concrete blocks were used which were prepared from Type 1 Portland cement, silica sand fine aggregate and 1 inch minus coarse aggregate in a weight proportion of cement to sand to coarse aggregate, on a per cubic yard basis, of 1:2:2.95. Each block measured one square foot by six inches thick. Each concrete test block thereby provided a one-square foot test surface. Each block contained eight steel reinforcing bars running through the length of the block and extending outwardly from the block at each end of the bar. One set of four steel bars was located one inch below the test surface and the bars were spaced apart on 2½ inch center-line distance. A second set of four bars was parallel to the first set, one inch above the bottom surface of the block. The one square foot test surface of the block was grit blasted to remove laitance. More particularly, the test surface was blasted with grit of No. 20 $Al_2O_3$ at 70 psi, using a 4 inch standoff and at a 45°–60° angle. The resulting surface was then cleaned of grit using compressed air.

After compressed air cleaning, of a concrete test block, it was flame sprayed using an oxyacetylene flame with a 3.2 mm. diameter grade 1 titanium wire feed, and a Metco 10E flame spray gun. For the flame spraying, the gases used, and conditions, were: oxygen at 30 psi and flowmeter at 15; acetylene at 15 psi and flowmeter at 30; compressed air at 65 psi and flowmeter at 53. The titanium metal was applied in 4 passes at a gun speed of 300 mm/sec, and at a standoff of 6 inches. The weight of the titanium metal consumed was 70.8 g/ft². The bond strength between the flame spray applied titanium layer and concrete substrate was evaluated. This was done by an Elcometer Adhesion Tester Model No. 106 which tested adhesion by pulling a test dolly that had been epoxy glued to the coating away from the substrate. The coating thus produced had a bond strength of 208 psi, as measured by the Elcometer adhesion tester, and a resistance of 0.15 ohms/square. The coating was porous (estimated at 80% dense from photomicrographs) and had a measured thickness of 100 microns (4 mils) using a photomicrograph scale of cross sections. Thus, titanium metal as a wire feed to a flame spray gun can be suitably applied to concrete. The application results in a serviceable titanium metal coating having acceptable adhesion, porosity and coating thickness.

The concrete and titanium metal coating described above were then energized anodically in an outdoor test yard at a current density of 2.0 mA/ft² by attaching one lead of a constant current power supply to the coating and the other lead to the concrete reinforcement. After one month on-line, the concrete block was operating at a voltage ranging from 2.5–4.0 volts. The electrode potential of the titanium coating was 1230 mV vs. a saturated calomel reference electrode, and the electrode potential was slowly drifting more anodic with time. After 200 days on-line, the voltage had elevated to 6 volts and the coating potential was 1800 mV vs. the reference electrode. Hence, the uncatalyzed titanium provides only threshold cathodic protection, since its potential is high and it is slowly passivating with time.

EXAMPLE 2

A concrete block, as described in Example 1, was grit blasted and then cleaned, all as described in Example 1. It was flame sprayed with grade 1 titanium using the wire feed and a Metco 10E flame spray gun, and while using the oxygen, acetylene and air conditions all as described in Example 1. The titanium metal was applied in 3 passes at a gun speed of 500 mm/sec, and a standoff of 4½ inches. The weight of the titanium metal consumed was 42.5 g/ft². The coating thus produced had a bond strength of 100 psi, and a resistance of 0.17 ohms/square. The coating was porous (estimated at 80% dense) and had a measured thickness of 75 microns (3 mils), measured as described in Example 1.

The titanium metal coating was then painted with an aqueous solution containing 300 g/l of cobalt nitrate hexahydrate, $(Co(NO_3)_2) \cdot 6H_2O$. This coat was allowed to air-dry, and a second coating of the same solution was applied. A total of 14½ ml of solution were used, resulting in an application of 0.88 g/ft² of cobalt to the titanium metal coating.

The concrete block was then energized anodically in an outdoor test yard at a current density of 2 mA/ft² in the manner as described in Example 1. This polarization caused cobalt oxide to be deposited within, and at the electrochemically active surfaces, of the titanium metal coating. The concrete block and the coating were maintained in this energized state and after one month on-line the block was operating at a voltage of 1.3 volts. The electrode potential of the activated coating was ranging from 580–600 mV vs. a saturated calomel reference electrode, and was stable with time. After 150 days on-line, the voltage was still 1.3 volts and the coating potential ws 600 mV vs. the reference electrode. This example shows how a cobalt activated flame sprayed titanium metal coating can provide for cathodic protection of the block in a low voltage, low potential and stable operation.

EXAMPLE 3

A concrete block, as described in Example 1, was blasted with no. 40 black slag grit at 80 psi to roughen the concrete and provide a newly exposed surface. After compressed air cleaning, it was electric arc sprayed using a Hobart-Tafa Model 8830 electric arc gun with an extra-fine Red Nozzle spray tip. Air usage was 35 CFM (cubic feet per minute) at a pressure of 60 psi. Grade 1 titanium fed as two 1.6 mm diameter wires was sprayed onto the concrete in a single pass at a gun speed of 164 mm/sec and a standoff of 6 inches. Titanium consumed under these conditions was 89.7 g/ft². The coating thus produced had a bond strength of 269 psi, and a resistance of 0.35 ohms/square.

The titanium metal coating was then painted with an aqueous solution containing 300 g/l cobalt nitrate hexahydrate. This coat was allowed to air dry and a second coat of the same solution was applied. A total of 33.7 ml of solution was used resulting in an application of 2.04 g/ft² of cobalt to the titanium metal coating.

The concrete block was then energized indoors in a chamber with 80–90% relative humidity at a current density of 2.0 mA/ft² in the manner as described in Example 1. This polarization caused cobalt oxide to be deposited within, and on the electrochemically active surfaces of the titanium metal coating. The concrete block and the coating were maintained in this energized state and after 20 days on-line the block was operating at a voltage of 1.65 volts. The coating was operating at an electrode potential of 730 mV vs. a saturated calomel reference electrode and was stable with time. This example shows how a cobalt activated electric arc sprayed titanium metal coating can provide for cathodic protection of the reinforced concrete block with a low operating voltage, low electrode potential, and stable operation.

EXAMPLE 4

A concrete block, as described in Example 1, was blasted with No. 20 aluminum oxide grit to roughen the concrete and provide a newly exposed surface. After compressed air cleaning, it was electric arc sprayed using a Hobart-Tafa Model 8830 electric arc gun. The metal sprayed was grade 2 titanium in wire form. The metal is sprayed onto the concrete in a double path at a gun speed of about 10 inches/sec, a standoff of 6 inches and an electrical current of 150 amps. The titanium wire consumed under these conditions was 56 g/ft². The coating thus produced had a bond strength of 210 psi.

Two additional concrete blocks were prepared for coating as described above. For one block, 24 hours before the application of the titanium coating, the concrete block was painted in the manner of Example 3 with cobalt nitrate hexahydrate to provide a coating of 1.3 g/ft² of cobalt to the concrete. An additional concrete block was prepared in the same way, but the coating providing the 1.3 g/ft² of cobalt on the block was applied 15 minutes before the application of the titanium coating. Both blocks then had titanium applied in the manner as described hereinabove.

The block first prepared as described hereinabove with the titanium coating directly on the concrete, was then treated in the manner described hereinbefore by painting the cobalt nitrate hexahydrate solution on the titanium metal coating to provide 1.3 g/ft² of cobalt to the applied titanium metal. All three concrete blocks were then energized indoors at a current density of 2.0 mA/ft² in the manner as described in Example 1. This test continued for five days and the blocks were then monitored for cell voltage. The block which was activated with the cobalt-containing coating that had been applied over the titanium metal coating, was operating at a cell voltage of 1.8 volts. The two blocks which had the cobalt coating applied directly to the concrete block, prior to the titanium coating, exhibited unacceptable readings. The block coated with the cobalt-containing coating 24 hours before the titanium metal spray coating had a voltage of 7.2 volts and the block coated with the cobalt solution 15 minutes before applying the titanium coating had a voltage of 7.0 volts.

For these two blocks with unacceptable voltages, tap water was sprayed on the exposed titanium surface of the blocks. The cell voltages were then taken two days later with the block having the cobalt solution applied on top of the titanium layer still providing an acceptable 1.62 volts. The other two blocks were also demonstrating acceptable voltages. The block coated 24 hours earlier with cobalt solution before titanium application had a voltage of 2.03 volts while the block coated 15 minutes with cobalt solution prior to titanium application had a voltage of 1.88 volts. After a further week, these voltages for these three blocks, respectively, were 1.58 volts, 1.79 volts and 1.82 volts. This example thus demonstrates successful activation of the concrete surface for solution applied directly to the concrete prior to application of the spray applied titanium metal. However, water activation is advantageous for best success.

EXAMPLE 5

A coating of titanium metal was produced, on a one square foot concrete block test surface prepared as described in Example 1, for each of eight concrete blocks. The feed metal used was a titanium powder having particle size between 200 and 325 mesh. The powder was 99.5% titanium, with a balance of impurities including iron, carbon, nitrogen, oxygen and hydrogen. The test surface was coated with the metal using a Metco plasma spray gun equipped with a GH spray nozzle. The spraying conditions were: a current of 500 amps; a voltage of 45–50 volts; a plasma gas consisting of argon and helium; a titanium feed rate of 3 pounds per hour; a transverse spray speed of either 400, 500 or 800 millimeters per second (mm/sec.); an exposure of one pass per block; and a standoff of 2.75 (4 blocks) or 4 (4 blocks) inches. Two concrete blocks had their test surfaces preheated before the plasma spray application of the titanium layer. Preheating was done by one pass with the plasma spray gun at a transverse speed rate of 400 mm/sec. and a standoff of 4 inches for one block and 2.75 inches for the other block.

All coated surfaces, by visual examination, appeared to be free from surface defects, and have a uniform, but porous coating with no coating delamination from the concrete substrate.

For coating a second set of the concrete blocks, there was used a commercially available titanium powder, having a median particle size of 325 mesh. The same spray conditions were used as described above except that an exposure of 2 passes per block were used for one block, and for this block the titanium metal was applied at a transverse spray speed of 400 mm/sec. and a standoff of 2.75 inches. From the results of adhesion testing for these samples, the adhesion between the titanium layer and the concrete substrate was found to vary from 275 psi to 400 psi. This example shows how titanium metal as powder can be plasma sprayed onto concrete to provide a desirable metal coating preparatory to providing an electrochemically active metallic coating. The titanium metal coating can have desirable bond strength with the concrete, under a variety of application conditions.

EXAMPLE 6

Concrete test blocks as described in Example 1 were prepared in the manner of Example 1 with the grit blasting being conducted for 2 minutes and 10 seconds, plus or minus 5 seconds. A first test block was preheated in the manner described in Example 5 but using a 3 inch standoff. Thereafter the coating applied on the concrete block test surface was initiated with a titanium oxide powder, having all particles more finely divided than −44 microns, +5.6 microns. The spray gun and spray conditions were as described in Example 5, e.g., one pass application, at a 400 mm/sec. transverse spray speed, except that the plasma spray gas consisted of argon and hydrogen, the standoff was 3 inches and titanium oxide feed rate was 7 pounds per hour. Following this application, there was then applied to the resulting titanium suboxide layer an over layer of titanium metal using the powder as first described in Example 5. This titanium metal powder was plasma spray gun applied, in three passes, in the manner of Example 5.

Subsequently, three more test blocks were prepared with this titanium suboxide first layer, titanium metal overlay combination. Each of the subsequent blocks were preheated in the manner as above described at a transverse spray gun speed of 500 mm/sec. For the titanium suboxide application, the spray gun transverse spray speed was at 400 mm/sec. for one block and at 800 mm/sec. for 2 blocks, all at a 3 inch standoff. The titanium metal powder top coating was applied as described above in this example, including three passes of the spray gun.

For selected surfaces, the resulting combination layer of titanium suboxide underlayer and titanium metal overlay on the concrete blocks surface was found to have a thickness of about 100 microns. Coating adhesion for these blocks, measured in the manner as described in Example 1, was found to vary from 200 psi to 300 psi. This example shows how such a combination layer can be desirably prepared on concrete using plasma spraying. The combination layer exhibits both desirable coating thickness and bond strength.

EXAMPLE 7

A concrete test block as described in Example 1 was provided with a titanium metal layer in the manner as described in Example 5. The plasma spray applied titanium metal layer on the concrete had a thickness of about 30 microns and an adhesion to the concrete surface of about 300 psi, all as determined in a manner as described hereinbefore. The titanium layer was then coated with an aqueous solution of manganese sulfate ($MnSO_4$) containing 100 gm/1 (grams per liter) $MnSO_4$. This coating resulted in a loading of 1.1 gms of Mn per square foot of titanium metal.

The test block was then energized by making the coating anodic at a current density of 2.0 $mA/ft^2$. The coating, when energized, operated at 2.0 $mA/ft^2$ at a single electrode potential of 545 mV vs. a saturated calomel reference electrode, confirming good activation of the titanium metal.

EXAMPLE 8

A concrete block, as described in Example 1, was grit blasted and then cleaned, all as described in Example 1, except the grit blasting was at a 90° angle. The block was arc sprayed using a 1.59 mm diameter grade 1 titanium wire feed in a Hobart-Tafa Model 9000 wire arc gun fitted with a green air cap and a large cross positioner. The carrier gas to propel the atomized titanium onto the concrete surface was air at 60 psi. Gun speed was 200 mm/sec at an index (jump) of 9 mm and a standoff of about 4 inches (10 cm). Titanium consumed under these conditions was 31.4 $g/ft^2$. The coating was produced at a bond strength of 283 psi and a resistance of 0.33 ohms/square. Titanium weight gain, as measured by weighing the block before and after titanium application, was 23.92 $g/ft^2$, indicating a deposit efficiency of 76.2%.

A second concrete block was prepared as above described and titanium was applied using the conditions as above described, except that the gun standoff was 4.5 inches, and nitrogen was used as the carrier gas. Under these conditions, the electrical resistance of the resulting applied titanium coating was 0.20 ohms/square. Bond strength was still a desirable 233 psi. Moreover, in addition to the improvement in electrical resistance, the titanium weight gain was measured as 27.20 $g/ft^2$, indicating a deposit efficiency of 86.6%. These tests demonstrate that the use of nitrogen as the carrier gas resulted in a more efficient deposition of titanium, providing a titanium coating which is thicker and more conductive than coatings using air as carrier gas.

We claim:

1. The method of protecting reinforced concrete with cathodic protection coating on a surface of said concrete, which method comprises thermally spraying together an electrochemically active material and a non-corroding metal onto a surface of said concrete.

2. The method of claim 1, wherein a mix of said metal and an electrochemically active material is thermally sprayed onto said concrete surface.

3. The method of claim 2, wherein said mix comprises titanium as an intermetallic mixture with at least one other metal, or titanium with at least one oxide of a metal.

4. The method of claim 1, wherein a thermal spray of said metal mixes on the surface of said concrete with a separate thermal spray of said electrochemically active material.

5. The method of claim 4, wherein said electrochemically active material contains a platinum group metal or contains at least one oxide selected from the group consisting of platinum group metal oxides, magnetite, and oxides of cobalt, manganese and lead.

6. In the method of cathodically protecting reinforced concrete with a non-corroding, electrochemically active coating which is present as a metal-containing coating on the surface of said concrete, which metal-containing coating initially contains a metal-containing layer having at its surface a material comprising a precursor composition convertible to an electrochemically active ingredient for said metal-containing coating, the improvement in said method comprising establishing on said concrete such metal-containing layer along with said precursor composition, connecting said metal of the metal-containing layer in an electrical circuit, and anodically polarizing said metal to convert said precursor composition to an electrochemically active ingredient.

7. The method of claim 6, wherein said metal-containing coating comprises titanium metal which is connected in an electrical circuit with the reinforcement of said concrete.

8. The method of claim 6, wherein material comprising said precursor composition is applied to said metal surface by at least one method selected from the group consisting of painting and spraying.

9. The method of claim 6, wherein the material comprising said precursor composition contains a metal in solution, wherein the metal is one or more selected from the group consisting of cobalt, manganese, iron and tin, and wherein said electrochemically active ingredient contains said metal in electrochemically active form.

10. The method of claim 6, wherein said metal surface is anodically polarized at a current density of at least about 1 $mA/ft^2$.

11. The method of protecting reinforced concrete with a cathodic protection coating by applying an adherent, non-corroding and electrochemically active metallic coating to a surface of a concrete substrate, which method comprises:

roughening the surface of said concrete by abrading said surface and freshly exposing a concrete surface; and thermally spraying a valve metal selected from the group consisting of titanium, tantalum, niobium, zirconium, hafnium, molybdenum, tungsten, alloys of same and intermetallic mixtures, onto the resulting roughened surface with a spray gun in an amount of sprayed metal having a thickness of from about 20 microns to about 200 microns;

wherein said spraying comprises:

applying said metal onto said concrete at a standoff from the surface of said concrete within the range of from about 2½ inches to about 6 inches; while conducting said spraying at an application rate across the concrete surface at a speed within the range of from about 100 to about 800 millimeters per second.

12. The method of claim 11, wherein said spraying provides a metal coating having a thickness of from about 25 to about 100 microns, said metal coating being applied at a gun speed of from about 200 to about 500 millimeters per second.

* * * * *